No. 800,093. PATENTED SEPT. 19, 1905.
W. S. FILLEY.
DENTAL DEVICE.
APPLICATION FILED NOV. 5, 1904.
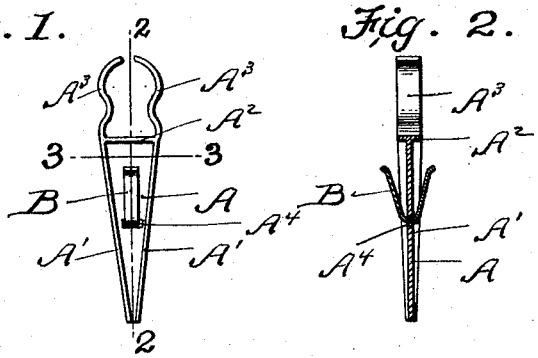
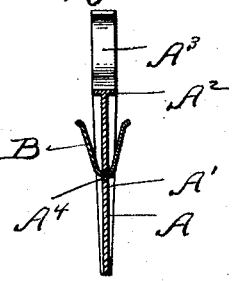
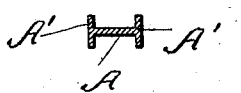
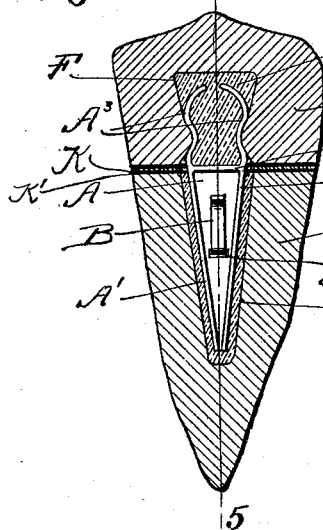
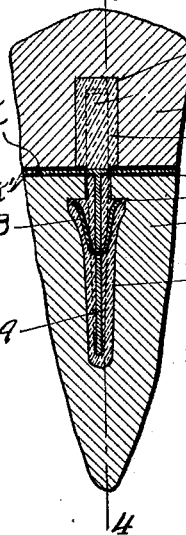
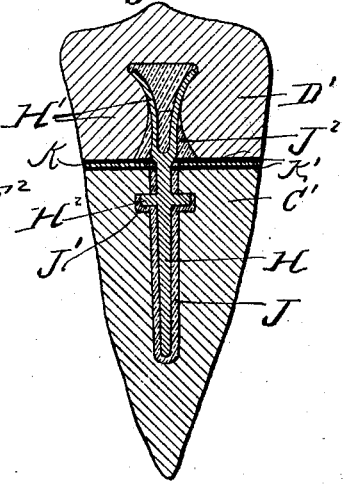
Witnesses
Ernest Pulsford
E. B. McBath
Inventor
W. S. Filley
by O'Meara & Brock
Attorney

UNITED STATES PATENT OFFICE.

WILLIAM S. FILLEY, OF MONTPELIER, OHIO, ASSIGNOR OF TEN-ELEVENTHS TO JOHN J. SIM, JOHN C. PARNELL, ROBERT B. DICKERSON, JOHN C. BARGER, JAMES T. O'BRYAN, CHARLES M. BOYD, JAMES D. HILL, WILLIAM A. SAUNDERS, H. G. MANN, AND CHESTER W. BRANNON, OF MONTPELIER, OHIO.

DENTAL DEVICE.

No. 800,093.  Specification of Letters Patent.  Patented Sept. 19, 1905.

Application filed November 5, 1904. Serial No. 231,529.

*To all whom it may concern:*

Be it known that I, WILLIAM S. FILLEY, a citizen of the United States, residing at Montpelier, in the county of Williams and the State of Ohio, have invented a new and useful Improvement in Dental Devices, of which the following is a specification.

This invention relates to a device for securing a crown to a root and also to a device of this kind adapted for use in bridgework whereby the tooth is detachable, permitting repair of the bridge without necessitating the removal of the abutments.

The invention consists of a bifurcated spring-pin provided with a detachable spring forming wings on opposite sides of the pin and a gasket fitting the pin-shank between the wings and the bifurcated portion of the pin.

The invention also consists in the novel features of construction and combination of parts hereinafter described, pointed out in the claims, and shown in the accompanying drawings, in which—

Figure 1 is a detail elevation of the pin. Fig. 2 is a longitudinal section through the pin on the line 2 2 of Fig. 1. Fig. 3 is a transverse section on the line 3 3 of Fig. 1. Fig. 4 is a vertical section through a root and crown, my device being shown therein in elevation, the section being of the line 4 4 of Fig. 5. Fig. 5 is a section on the line 5 5 of Fig. 4. Fig. 6 is a sectional view similar to Fig. 5, showing a modified form of pin.

In the drawings, A represents the shank portion of a pin flattened and wedge-shaped and having ribs or flanges A' on opposite edges and a connecting flange or rib $A^2$ at the top of the shank. The ribs $A^2$ are each extended above the upper edge of the shank portion A and form opposing springs $A^3$, which may be curved in a simple or compound curve, as may be desired. A slot $A^4$ is formed in the shank A, and through this slot is passed a leaf-spring B, which is curved upwardly and outwardly upon each side of the shank between the flanges A' and is adapted to be pressed inwardly against the flat faces of the shank and to rest between the opposing flanges as in a recess or groove.

In Figs. 4 and 5 I have illustrated my device thus far described as used in connecting a crown to a molar-root. The root C and crown D are recessed, the recess F of the crown having side walls conforming to the configuration of the spring-arms $A^3$ and enlarged in its upper portion and the recess F' of the root elongated or elliptical in horizontal cross-section near the top of the root and wedge-shaped when seen in cross-section as in Fig. 4. When viewed in cross-section at right angles to the sectional view in Fig. 4, as in Fig. 5, shoulders $F^2$ are noted as being formed adjacent the upper end of the recess F'. After the parts are placed in position the recesses F and F' are filled with any suitable cement E. To make a firm smooth union and to prevent acid from substances eaten or from liquids reaching and affecting the cement, I interpose between the crown D and root C a metal gasket K, which rests around the upper end of the shank A, and on each face of the gasket I place a wafer of gutta-percha, thus effectually sealing the joint against acids likely to injure the cement.

In Fig. 6 I have shown a slightly-modified form of device, in which the root C' is joined to a crown D' by a pin H, bifurcated at H'. This bifurcated portion corresponds to the spring-arms $A^3$ of the preferred form. The crown D' is recessed, the recess $J^2$ having the configuration of an hour-glass into which the bifurcated spring portion H' extends. The root C' is recessed, as shown at J, and is undercut on opposite sides, as shown at J'. The pin has lugs $H^2$ on opposite sides, and after being placed in the recess J in a position at right angles to that shown in Fig. 6 is turned a quarter of a revolution and the lugs $H^2$ engage the recess or undercut J', as shown in Fig. 6.

It will be understood that as the pin or shank A is passed into the root the ends of the spring B will lie close to the shank and will spring outwardly when the shoulders $F^2$ are passed, locking the pin in the root. The cement will form a wedge between the spring-arms $A^3$ and will lock the crown against detachment from the root, while the gasket and gutta-percha will make the joint smooth and tight.

Having thus fully described my invention, what I claim as new, and desire to secure by Letters Patent, is—

1. A dental device comprising a pin having a flattened shank, flanges on the edges of the shank extending above the shank, the said shank being slotted, and a leaf-spring extending through the slot and lying on opposite sides of the shank between the flanges.

2. A pin comprising a wedge-shaped, flattened shank, flanges carried by the edges of the shank and extending above the upper end of the shank, a connecting-flange along the upper end of the shank, and a detachable spring forming wings upon opposite sides of the shank.

3. The combination with a root recessed and having undercuts forming shoulders on opposite sides of the said recess, and a crown-tooth having a recess with inwardly-bulging side walls, of a pin having upwardly-extending spring-arms adapted to engage the said walls of the crown-tooth recess, the said pin extending downwardly into the recess of the root, and locking means carried by the pin adapted to engage the shoulders formed in the root.

4. The combination with a recessed root and crown, of a pin having a flanged shank extending into the root, said shank being slotted, a spring passed through the slot and lying upon each side of the shank between the flanges, the root having a shoulder adapted to be engaged by the ends of the said spring, the flanges extending upwardly into the crown and forming spring-arms, a gasket on the shank between the root and crown, and a gutta-percha wafer on the gasket, as and for the purpose set forth.

WILLIAM S. FILLEY.

Witnesses:
D. A. WEBSTER,
C. C. DRAKE.